United States Patent Office 3,770,651
Patented Nov. 6, 1973

3,770,651
DELAMINATION OF MICA BY MOLTEN SALTS
Stanley Eugene Bakes, Wilmington, Del., assignor to E. I. du Pont de Nemours and Company, Wilmington, Del.
No Drawing. Filed Nov. 24, 1971, Ser. No. 201,974
Int. Cl. B03d 1/10
U.S. Cl. 252—378 R          7 Claims

ABSTRACT OF THE DISCLOSURE

Delamination of mica is effected by treatment of the mica with inert molten salts at temperatures of from about 500° C. to about 1000° C. and subsequent removal, e.g. dissolution, of the salts.

BACKGROUND OF THE INVENTION

The well-known and previously widely-practiced use of mica as an electrical insulating material has, in present economy, been largely superseded by other applications. Among these present day uses for mica, and particularly for the readily available and relatively cheap natural mica, is that as a substrate material for the deposition of metal oxide coatings to produce nacreous pigments. For incorporation of such a pigment in paints, lacquers and the like it is important that the mica be obtained in uniform, small particle size, of high surface area and of especially clean surface. These properties are desirable in order that the reflectance of the pigment will be high, and in order that the color of the pigment will be predetermined and of a clean hue. Impurities in the surface of the mica must therefore be minimized, and the mica must be delaminated and in a form in which it is usable either directly from the process of delamination without particle size reduction, or must be easily ground to produce such a size-reduced product.

Many methods of delamination of mica have been disclosed in the prior art. Among these may be mentioned the following procedures: Since all natural mica contains some water of constitution, it is possible to effect a certain degree of delamination of mica by the simple process of heating the natural mica. The water of constitution is thus dissociated from the mica, expanded to form steam, and by this expansion effects exfoliation of the mica flakes. Although this process is effective to a certain degree on any form of natural mica, only muscovite mica has in its composition sufficient water of constitution to allow for this method of delamination to an economically-effective degree.

This general process of delamination of mica by formation of steam has been further modified as described in U.S. Pat. No. 2,614,055 by heating the mica in the presence of an aqueous medium which may be water itself, or an alkaline or acid solution. In a further modification, according to U.S. Pat. No. 2,549,880 gas-forming chemicals are introduced into the mica crystals to delaminate and separate the crystals. In a still further modification of the delamination of mica by expelling water of constitution, there is described in U.S. Pat. No. 2,709,158, a process by which natural mica is heated and gas-forming chemicals are introduced. By subsequent lowering of the pressure, the gases which are formed between the layers are expanded, thus delaminating the mica crystals.

The earliest process for delamination of mica was the manual method of simply splitting the mica layers by means of a knife or other sharp tool. In a modification of this process, fluid jets or simply grinding of the mica was used as the means of delamination. In a more recent modification, the process of U.S. Pat. No. 3,110,299 proposes and claims that the laminar, fibrillated or foliated elements may be separated by applying an adhesive to each side of the crystal and by physical means pulling the layers apart thus to effect delamination.

Although each of these methods is, to a certain degree, effective in the production of thin flakes of mica, the prior art methods are not wholly satisfactory for one or more reasons such as:

(1) The mica flakes produced are, for the most part, not sufficiently delaminated to serve without further treatment in uses where this is a critical requirement;
(2) The delaminated mica which is obtained by prior art processes is non-uniform, both as regards the thickness of the flakes and the cross-sectional measurements thereof;
(3) The surface impurities which are present in natural mica are, for the most part, not diminished by these prior art processes; in fact, by some of these prior art processes more impurities may be exposed, thus increasing the proportion of available impurities for subsequent undesirable reactions when the mica is used;
(4) The processes require complicated apparatus, such as pressure vessels, vacuum systems, or grinding equipment;
(5) Where chemicals are used in these processes, the recovery of the chemicals entails additional equipment; or else the process becomes economically prohibitive because of the required use of expendable chemicals.

SUMMARY OF THE INVENTION

There is provided by the process of the present invention, a procedure whereby the aforementioned disadvantages of the prior art processes may be overcome, and a process provided wherein natural mica is delaminated to yield a very thin flake product, in which undesirable surface impurities in the mica are minimized. The process of the invention is carried out in simple apparatus comprising only a heated reactor constructed of material which is stable toward molten salt at temperatures of from about 500° C. to about 1000° C. and capable of being heated to a temperature at least as high as the melting point of the salt being used.

More specifically the invention provides a process for the delamination of mica by the steps of (a) effecting direct contact at a temperature of about 500° C. to about 1000° C. between the mica and at least about an equal weight proportion of a molten inorganic salt chemically inert toward the mica, and (b) thereafter separating the salt from the mica. In a preferred embodiment, the molten salt comprises one or more halides of an alkali metal or alkaline earth metal, the weight ratio of salt to mica is about 1:1 to 8:1, the temperature is about 700° C. to about 950° C., and the duration of the contact of mica with molten salt is about 5 to about 35 minutes. In any event, the separation of salt from mica in step (b) is readily effected by treating the mixture with water to dissolve the salt.

DETAILED DESCRIPTION OF THE INVENTION

The molten inorganic salt used as the delaminating agent may be a single compound or a mixture of compounds which are molten at a temperature between about 500° C. and about 1000° C. The composition of the melt is selected from compounds which are inert toward the mica to be treated.

The delamination can be brought about through direct contact between the mica being treated and an inorganic metal salt, or mixture, maintained in a molten condition. Preferably the metal salt is a chloride, or mixture of chlorides, selected from the alkali metals (lithium, sodium, potassium) or the alkaline earth metals (magnesium, calcium, strontium, barium) or cerium or zinc. In addition, use can be made of other halides as well as silicates, phosphates, titanates and borates of said metals, provided the salt is thermally stable and relatively involatile at its melting point and under the temperatures at which desired delamination is carried out. The salts are advantageously water soluble in order that they can readily be separated from the mica.

To a large extent the choice of salt is but a matter of economics. However, it will be recognized that some salts would be expected to be more effective than some others in combining with impurities in the mica and the subsequent removal of these impurities with the removal of the salt. Thus small amounts of such salts as, for example, $ZnCl_2$, $MnCl_2$, LiCl, and $MgCl_2$, can have a very desirable effect in cleaning the mica surfaces.

In carrying out the process of this invention, a preferred procedure is to allow the mica to fall freely in the salt melt in order that maximum expansion of the mica may take place. A particularly convenient method of operation is to provide a wire basket insert in the reactor into which the mica is allowed to fall. The wire basket may subsequently be removed from the reactor and used in draining away the molten salt and washing the mica to remove the salt. On a large scale or for a continuous process, the salt and mica mixture may be charged to a fluidized bed reactor while the suspension is maintained by means of a preheated inert gas, e.g. nitrogen.

For effective delamination of the mica flakes, it is preferable to employe a salt or mixture of salts of melting point between 500° C. and 1000° C., the lower of these temperatures being, approximately that at which water is eliminated from the mica crystal and the upper limit being approximately that at which some decomposition of the mica will begin. The preferred temperature for carrying out the invention is 700° to 950° C. The preferred time for heating at these temperatures is from about 5 to about 35 minutes, the longer times for heating being related to the lower temperatures and vice versa. It will be apparent that the contact time need only be sufficient to effect a desired degree of delamination.

Advantageously the weight of salt employed is at least equal to the weight of mica to be treated. While the process is operable even with large excesses of salt, the best economics are achieved with salt:mica ratios of 16:1 or less, but preferably 8:1 or less.

It is anticipated that any form of mica may be used in the operation of this invention and the quality of the mica upgraded thereby. It is also anticipated that the flakes of mica may be further broken up, if desired, by subsequent grinding of the mica either concurrent with the dissolving out of the salt from the mica flakes or as a separate operation before or after this dissolution is effected.

Although the reasons for the successful operation of this process in delaminating and cleaning of mica flakes are not completely known, and it is not intended that the process should be limited by any theoretical explanation thereof, it would seem that the following factors are particularly pertinent. In the sudden heating of the mica flake to a temperature higher than that at which the water of constitution will remain as a part of the mica crystal, sudden expansion of this water content has an explosive effect in breaking up of the mica at the weakest point of the crystal bond. The effect is the almost instant delamination of the mica flakes. The molten salt, being very effective in wetting the surfaces of mica easily penetrates into the interstices of the delaminated flakes effecting further separation of the crystal faces, thus resulting in further delamination of the mica crystal. The molten salts appear to have a cleaning effect on the mica flakes by dissolving adhered impurities or chemically combining with them so that they are removed along with the salt when the mica flakes are subsequently washed.

DESCRIPTION OF THE PREFERRED EMBODIMENTS

In order to illustrate the operation of my invention, the following examples are given. These are for purposes of illustration only, and are not to be held in limitation of the invention. Unless otherwise specified, all compositions are given in weight percent.

Example 1

Into a nickel crucible of 20 ml. capacity is placed 10 grams of a salt mix composed of 50% NaCl and 50% KCl. A small amount (approximately 0.1 g.) of NaF is added. The salt is melted by heating to 700° C. and several small mica chips, totaling about 0.1 gram are dropped into the melt. Almost immediately the mica swells to 2.5 to 3 times its original thickness. The salt melt containing the expanded mica chips is cooled and the salt dissolved in water and the mica flakes recovered by filtration. The product is easily finger-crushed into a powder.

Example 2

In this example a Vycor crucible of about 500 ml. capacity is charged with 300 grams of a salt mixture of the following composition:

|  | Percent |
|---|---|
| NaCl | 45 |
| KCl | 45 |
| $ZnCl_2$ | 5 |
| NaF | 5 |

The salt mix is melted by heating to a temperature of 800° C. and when at this temperature, chips of muscovite mica of about 1/32″ thickness are dropped into the salt melt. The chips are allowed to remain in the melt about 30 minutes and, with adhered salt, are removed from the melt. Upon addition of the mica chips to the salt melt, considerable bubbling occurs probably due in part to the expulsion of water from the mica crystals. The mica expands almost immediately on contact with the salt melt to a thickness of about one inch (32 times its original thickness).

The expanded mica chips are washed in water until chloride-free. The product is found to be thoroughly delaminated, and very fragile so as to be easily broken up with the fingers.

The fragile nature of the delaminated mica is shown by the following:

By mechanically agitating a mixture of 1 part of delaminated mica to 2.4 parts water, a thick paste is formed. When the same procedure is repeated using a sample of ordinary wet ground muscovite mica, i.e. one which is untreated with molten, salt, a thin slurry results.

Example 3

Into a Vycor flask of 500 cc. capacity is charged the following salt mix:

|  | Percent |
|---|---|
| 190 grams NaCl | 47.5 |
| 190 grams KCl | 47.5 |
| 20 grams $ZnCl_2$ | 5.0 |
|  | 100.0 |

The crucible is heated to 800° C. and ten grams of scrap muscovite mica is added. Almost immediately, the mica chips expand many times their original thickness and considerable bubbling occurs. After 15 minutes at 800° C., the delaminated mica is removed from the salt melt and leached in water to dissolve ahered salt. The slurry is treated in a blendor to reduce the flake particle size and the product is washed by filtration until chloride-free. The filter cake exhibits an exceptionally clean, glossy appearance.

This delaminated, washed mica is used to prepare a nacreous pigment, i.e. having a coating of titanium dioxide thereon, according to the general procedure given in Example 1 of U.S. Pat. No. 3,087,827 (Klenke et al.).

In this procedure, the mica is suspended in an aqueous titanyl sulfate solution, and the solution heated and boiled to effect precipitation of the TiO$_2$ product of hydrolysis to produce a nacreous pigment.

The nacreous pigment so prepared is incorporated in a standard lacquer formulation and found to be markedly superior in hiding power as compared to a similarly used nacreous pigment based upon the same mica but without a molten salt delamination treatment having been performed.

Example 4

This example illustrates variations in the conditions whereby delamination of mica is effected. In each case a piece of muscovite mica measuring 1 inch square by approximately 1 mm. in thickness (cut from a larger piece of mica) is mixed with a blend of salts consisting of 47.5% NaCl, 47.5% Kcl and 5% ZnCl$_2$ in the weight ratios of salt to mica shown in the table. In each case, the heating is carried out in a crucible, one half of the salt being placed in the crucible first, the mica next, and the remainder of the salt placed on top of the mica. The charged crucible is then placed in a muffle furnace preheated to 900° C., allowed to remain for the designated time and air quenched by removal from the furnace. For the "Control" samples, heating of the mica is carried out in the absence of salt. The results of these tests are shown in Table 1.

In each case, except at the 16:1 ratio, a homogeneous semi-solid mass of salt and mica results. The high proportion of salt at the 16:1 ratio gives a molten salt phase which is decanted and not included in the final weight shown in the table.

As will be seen from the table, maximum expansion of the mica is obtained at a salt to mica ratio of 8, when the heating time is only five minutes and the temperature 900° C. It is observed that when the salt/mica mix is held for more than five minutes at 900° C. the expanded mica begins to contract.

Example 5

In this example NaCl and KCl are used, respectively, as the sole salts. The procedure followed is that of Example 4. Results are shown in Table 2.

TABLE 2

| Salt/mica ratio | Weight (grams) | | | Temp. (° C.)/ time (min.) | Thickness (mm.) | | Degree of expansion |
| --- | --- | --- | --- | --- | --- | --- | --- |
| | Mica before heating | Salt | Mica plus salt after heat | | Before heat | After heat | |
| 8:1 (NaCl) | 1.20 | 9.60 | 10.10 | 900°/5 | 1 | 45 | 45× |
| 8:1 (KCl) | 1.30 | 10.40 | 10.40 | 900°/5 | 1 | 45 | 45× |

The results show that NaCl and KCl are equally effective in the delamination process and approximately to the same degree as is the mixed salt of these and ZnCl$_2$ as shown in the previous examples.

What is claimed is:

1. Process for the delamination of mica by the steps of (a) effecting direct contact at a temperature of about 500° C. to about 1000° C. between the mica and at least about an equal weight proportion of a molten inorganic salt chemically inert toward the mica, and (b) thereafter separating said salt from the mica.

2. Process according to claim 1 wherein the molten salt comprises one or more alkali metal or alkaline earth metal halides.

3. Process according to claim 2 wherein the molten salt is an alkali metal chloride or mixture thereof.

4. Process according to claim 3 wherein the molten salt is potassium chloride or sodium chloride.

5. Process according to claim 2 wherein the molten salt comprises a mixture of potassium chloride, sodium chloride, and zinc chloride.

6. Process according to claim 1 wherein the weight ratio of salt to mica is about 1:1 to 8:1, the temperature is about 700° C. to about 950° C., and the duration of said contact is about 5 to about 35 minutes.

TABLE 1

| Salt/mica ratio | Weight (grams) | | | Temp. (° C.)/ time (min.) | Thickness (mm.) | | Degree of expansion |
| --- | --- | --- | --- | --- | --- | --- | --- |
| | Mica before heating | Salt | Mica plus salt after heat | | Before heat | After heat | |
| 1:1 | 1.50 | 1.50 | 2.95 | 900°/5 | 1 | 7.8 | 7.8× |
| 2:1 | 1.50 | 3.00 | 4.38 | 900°/5 | 1 | 12.8 | 12.8× |
| 4:1 | 1.58 | 6.32 | 7.70 | 900°/5 | 1 | 16.5 | 16.5× |
| 8:1 | 1.60 | 12.80 | 13.85 | 900°/5 | 1 | 37.5 | 37.5× |
| 16:1 | 1.40 | 22.4 | 15.78 | 900°/5 | 1 | 18.0 | 18.0× |
| Control | 1.45 | None | 1.38 | 900°/5 | 1 | 6.25 | 6.25× |
| 1:1 | 1.50 | 1.50 | 2.85 | 900°/30 | 1 | 4 | 4× |
| 2:1 | 1.30 | 2.60 | 3.75 | 900°/30 | 1 | 4 | 4× |
| 4:1 | 1.50 | 6.00 | 7.28 | 900°/30 | 1 | 6 | 6× |
| 8:1 | 1.50 | 12.00 | 12.92 | 900°/30 | 1 | 11 | 11× |
| Control | 1.45 | None | 1.38 | 900°/30 | 1 | 3 | 3× |

7. Process according to claim 1 wherein the step (b) is effected by treating the mixture of mica and salt with water to dissolve the salt.

References Cited

UNITED STATES PATENTS

| 3,427,127 | 2/1969 | McCollum | 252—378 R |
| 3,608,835 | 9/1971 | Ruzicka | 241—4 |
| 3,686,134 | 8/1972 | Robinson | 252—378 R |

ALFRED L. LEAVITT, Primary Examiner

F. FRISENDA, Assistant Examiner

U.S. Cl. X.R.

156—344; 241—4; 252—378 P